US008427326B2

(12) United States Patent
Ben David

(10) Patent No.: US 8,427,326 B2
(45) Date of Patent: Apr. 23, 2013

(54) METHOD AND SYSTEM FOR DETECTING THE PHYSIOLOGICAL ONSET OF OPERATOR FATIGUE, DROWSINESS, OR PERFORMANCE DECREMENT

(75) Inventor: Meir Ben David, Raa'nana (IL)

(73) Assignee: Meir Ben David (IL)

( * ) Notice: Subject to any disclaimer, the term of this patent is extended or adjusted under 35 U.S.C. 154(b) by 258 days.

(21) Appl. No.: 12/846,555

(22) Filed: Jul. 29, 2010

(65) Prior Publication Data

US 2011/0043350 A1    Feb. 24, 2011

Related U.S. Application Data

(60) Provisional application No. 61/229,868, filed on Jul. 30, 2009, provisional application No. 61/267,023, filed on Dec. 5, 2009.

(51) Int. Cl.
*G08B 23/00* (2006.01)
(52) U.S. Cl.
USPC ..... 340/575; 340/573.1; 340/438; 340/425.5; 600/301

(58) Field of Classification Search .................... 340/575
See application file for complete search history.

(56) References Cited

U.S. PATENT DOCUMENTS

| | | | | |
|---|---|---|---|---|
| 7,397,382 B2 * | 7/2008 | Ikegami et al. | ............... | 340/575 |
| 7,894,887 B2 * | 2/2011 | Yanai et al. | ................... | 600/509 |
| 8,096,946 B2 * | 1/2012 | Burton | ........................ | 600/301 |
| 2008/0042856 A1 * | 2/2008 | Power | ......................... | 340/575 |
| 2008/0071152 A1 * | 3/2008 | Moriya et al. | ............... | 600/301 |

* cited by examiner

Primary Examiner — Kerri McNally

(57) ABSTRACT

A method for detecting the onset of drowsiness in an operator of a vehicle or other apparatus. The operator grips a steering wheel or similar control handle, which continuously outputs gripping signals. The method provides for dynamic offset removal to obtain baseline signals, selection of physiologically-significant signals, combining and processing signals to form a proxy signal, analysis of the proxy signals to detect patterns indicative of the onset of drowsiness, and generating alerts as appropriate. The method provides for multiple sliding windows, for dynamic baseline adjustment; and statistical processing to detect physiologically-meaningful patterns indicative of the onset of drowsiness, as distinct from incidental changes in operator gripping through hand position readjustment during normal operation.

17 Claims, 12 Drawing Sheets

METHOD AND SYSTEM FOR DETECTING THE PHYSIOLOGICAL ONSET OF OPERATOR FATIGUE, DROWSINESS, OR PERFORMANCE DECREMENT

REFERENCE TO RELATED APPLICATIONS

The present application claims benefit of U.S. Provisional Patent Application No. 61/229,868, filed Jul. 30, 2009, and U.S. Provisional Patent Application No. 61/267,023, filed Dec. 5, 2009, the disclosures of which are hereby incorporated by reference and the priority of which are hereby claimed pursuant to 37 CFR 1.78(a) (4) and (5)(i).

FIELD OF THE INVENTION

The present invention relates to physiological monitoring and, more particularly, to a method and system for detecting the onset of operator fatigue, drowsiness, or impaired performance.

BACKGROUND OF THE INVENTION

Systems are known in the art for monitoring a human operator of equipment or machinery, including but not limited to motor vehicles, and issuing an alerting signal whenever signs of the onset of fatigue, drowsiness or impaired performance are detected. Such a system is denoted herein as a "fatigue monitoring system" (FMS).

A fatigue monitoring method and system is disclosed, for example, in co-pending U.S. patent application Ser. No. 11/900,291, filed Sep. 12, 2007 by two of the present inventors and published as U.S. Patent Application Publication Number 2009/0066521 on Mar. 12, 2009, which is incorporated herein by reference. This referenced application also cites several other such systems in the prior art.

Typically, a fatigue monitoring system includes a multiplicity of like sensors attached to the body of the operator or to an operating handle to be gripped by the operator while controlling the equipment, such as the steering wheel of a motor vehicle, or to both the operator and the handle. The term "like sensors" herein denotes multiple sensors which are physically similar and which monitor the same physical variable (non-limiting examples of which are pressure, temperature, electrical voltage, and the like). Like sensors are typically not identical, in that they generally exhibit variations in their physical characteristics, including, but not limited to: sensitivity, offset, and temperature coefficient. For purposes of the present invention, each independent signal is considered to come from a different sensor, even if the sensors are physically combined into a single unit.

A sensor of the operating handle or steering wheel outputs a signal indicating the gripping force exerted by the operator. The term "gripping force" herein denotes physical force or pressure of the operator's grip on the operating handle or steering wheel.

Sensors attached to the body of the operator may sense any of a variety of physiological variables or signals, non-limiting examples of which include: EEG signals; EKG signals; EMG signals; blood pressure; and skin temperature. Sensors attached to an operating handle may sense any of a variety of physical variables, including, but not limited to: gripping pressure; and temperature. In the particular case of a motor vehicle, such sensors are typically attached to, or imbedded in, the steering wheel, or a sleeve that is mounted on the steering wheel, wherein the sensors are arranged around the circumference or on other parts thereof. For the sake of clarity the present invention is herein illustrated in terms of the non-limiting example of operator grip-pressure sensors on the steering wheel of a motor vehicle, but the invention is to be understood as applicable, with obvious modifications, to other types of sensors attached to handles of other types of equipment and/or to the body of the operator, as disclosed in U.S. Pat. No. 6,353,396 to Atlas ("Atlas '396"), one of the present inventors.

In prior-art fatigue monitoring systems, output signals from gripping pressure sensors are typically processed so that, after filtering and normalization, the intensity of the output signals is compared with some threshold level and an alerting signal is generated whenever the intensity drops below the threshold level; in the Atlas '396 system, a certain function of each signal is compared with one or more threshold levels and one or more types of alerting signals are generated accordingly. Several disadvantages are inherent to the prior-art processing of the sensor signals, the primary disadvantage being due to the fact that gripping pressure, even by a fully alert operator, typically varies with time—in response to, for example, road conditions; comparison of signal intensity with a fixed threshold may then result in a varying relation to the state of fatigue of the operator and thus give rise to the generation of false alerting signals. Another disadvantage is due to the general variability of the output signals between the sensors, as well as with time; prior art processing does not reduce the effect of such variability and thus diminishes the potential sensitivity and accuracy of the system. A further disadvantage of the prior art lies in the manner of selecting only the signals from sensors that are responsive to gripping pressure at any given time—which is necessary in order to decrease the amount of noise in the signal, thus improving the accuracy of the system.

SUMMARY OF THE INVENTION

The present invention provides a method and system for processing signals output by sensors in a fatigue monitoring system. Its object is to process the signals so as to determine the onset of fatigue more consistently and reliably than is achievable by methods of prior art.

The terms "operator fatigue" and "fatigue" herein denotes any physiological impairment of operator performance caused by conditions including, but not limited to drowsiness or the onset of drowsiness. The present invention is described herein in terms of various embodiments, and by way of the illustrative non-limiting example of monitoring the alertness of a motor vehicle driver by means of grip pressure sensors on a steering wheel and detecting the onset of drowsiness by analyzing the signals therefrom. It is understood that a vehicle driver is a special case of an operator, and the term "driver" is herein understood to be synonymous with the term "operator" for the case of a motor vehicle operator. It is also understood that the onset of drowsiness is a non-limiting example of operator fatigue.

The term "physiological onset of operator fatigue" herein denotes the condition of operator fatigue via the monitoring and analysis of externally-measurable physiological phenomena, preferably during the initial stages of fatigue, during which time the operator still possesses adequate cognitive facilities and is still capable of operation, and before the occurrence of potentially catastrophic operator failure, such as through loss of consciousness. The detection of the physiological onset of operator fatigue thereby provides a window of opportunity to signal an alert in time to prevent the catastrophic failure.

FIG. 1 is a flowchart of an embodiment of the present invention, showing the following successive steps in the processing, after digitization, of output signals from the sensors—
  (i) a dynamic offset removal step 101 for removing the offset from individual signals;
  (ii) a signal selection step 103, for selecting the physiologically-significant signals;
    The term "physiologically-significant signal" herein denotes a signal which is correlated with a measurable physiological condition in the operator, which is indicative of the physiological onset of fatigue.
  (iii) a proxy signal step 105 for combining the signals to form a proxy signal for the grip signals;
    The terms "proxy signal" and "proxy function" herein denote a variable which is derived from one or more physical transducer outputs which have been processed. Processing includes, but is not limited to: analog processing; digital processing; combining, averaging, and statistically processing multiple signals; sampling, smoothing, approximating, interpolating, and the like; digitizing; transforming; filtering; correlating; fitting, scaling, translating, and rotating; and error-correcting.
    The term "proxy grip signal" herein denotes a proxy signal related to grip signals.
  (iv) a drowsiness-detecting step 107 involving processing the proxy grip signal to detect a pattern indicative of the physiological onset of operator fatigue; and
  (v) an alert-generating step 109 for creating an alerting signal in response to detecting operator fatigue onset.

Each of the above steps serves to increase the reliability and consistency of the results, with the objective of timely issuing an alert upon the onset of operator fatigue. The above five steps are explained in further detail below, in their flow sequence.

BRIEF DESCRIPTION OF THE DRAWINGS

The present invention will be more fully understood from the following detailed description of the embodiments thereof, taken together with the drawings in which.

DETAILED DESCRIPTION OF THE EMBODIMENTS

The principles and operation of a method and system for detecting the onset of operator fatigue, drowsiness, or impaired performance according to embodiments of the present invention may be understood with reference to the drawings and the accompanying description.

Dynamic Offset Removal

Pressure sensors mounted on steering wheels typically exhibit inherent shortcomings. For example, even when no pressure is applied there is generally a non-zero signal output, denoted herein as "hands-off offset" (i.e., with the operator's hands off the steering wheel) or simply as "offset", which typically varies among the sensors and also varies with time. Therefore, as a first processing step, the offset value of each sensor is dynamically removed—the offset is periodically obtained and then subtracted from the signal—in order to obtain a consistent and reliable signal. At each period the offset value is obtained by calculating the average of certain preceding raw signal values (as detailed, for example, below) and this value, until updated by a newer one, is subtracted from subsequent raw values before passing them on to the next processing step; resulting negative values are replaced by zero.

Hands-off offset takes into account the following components:
  1) a fixed sensor excitation signal;
  2) system noise;
  3) temperature-related drift;
  4) long term drift due to sensor aging; and
  5) hysteresis, where offset following a grip settled at a different level from its pre-grip value.

In an embodiment of the present invention, a system is equipped with a temperature sensor such that temperature related drift may be compensated for a known temperature drift coefficient, e.g. 0.36% per degree C. for some specific sensors.

The term "window" herein denotes a time interval extending from a given instant forward or backward in time, during which interval certain data are evaluated.

In real-time systems, such as systems according to certain embodiments of the present invention, windows extend from the present backwards in time, such that data values which were acquired during the window are presently evaluated according to one or more predetermined functions. Such real-time windows are also referred to as "sliding windows", because they constantly move forward in real time. Some specific windows according to embodiments of the present invention are discussed in more detail below.

Figure 1:
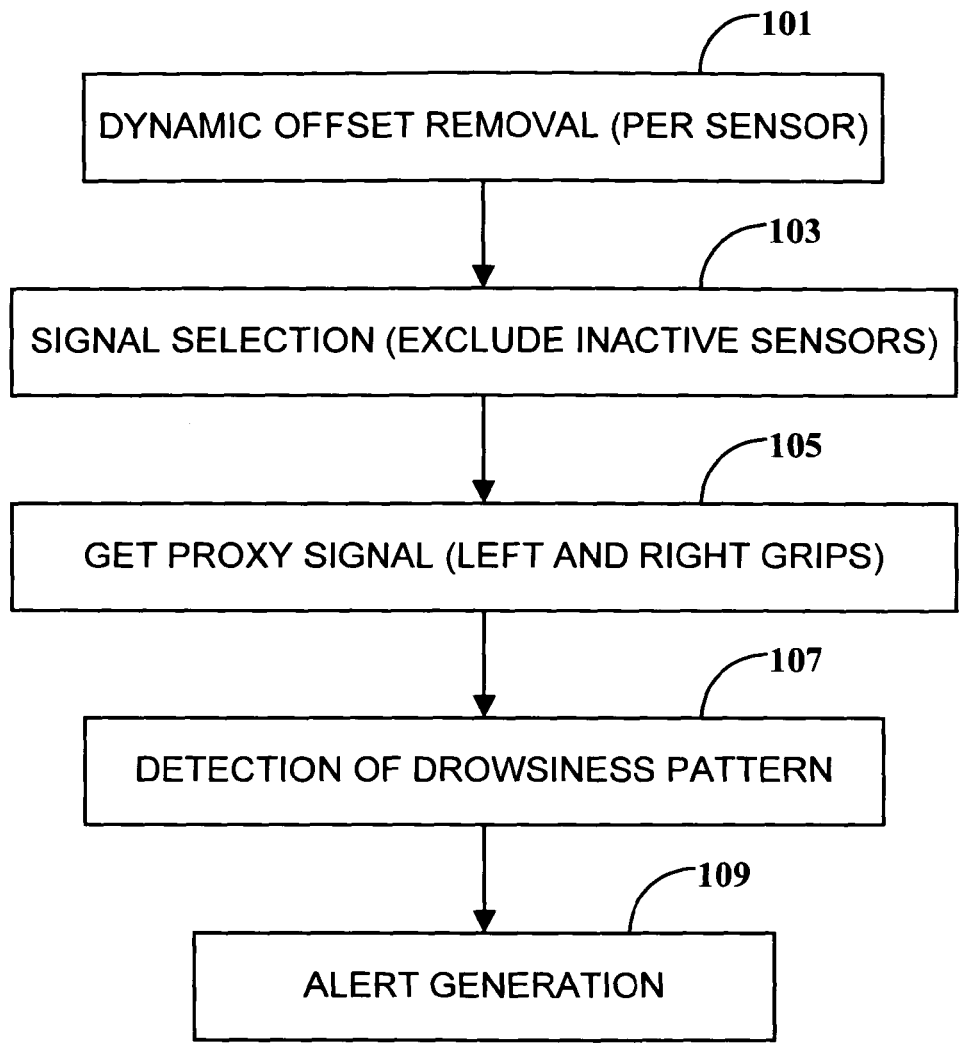
FIG. 1 is a flowchart of a method according to an embodiment of the present invention.
Figure 2:
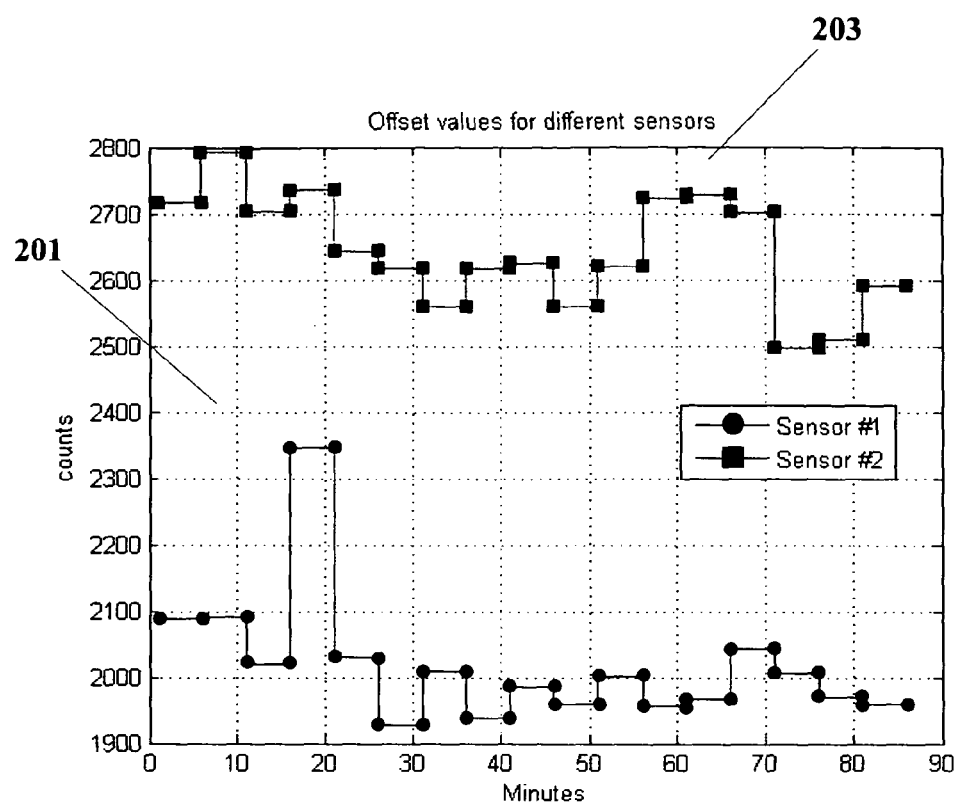
FIG. 2 is a graph showing computed offsets for two sensors according to an embodiment of the present invention.

FIG. 2 illustrates an example of an offset time variability 201 for a sensor #1 and an offset time variability 203 for a sensor #2. Each offset is updated every 5 minutes. After an offset is updated its value is subtracted from the corresponding sensor signal over next 5 minute time interval, until a new offset value is calculated.

Figure 3:
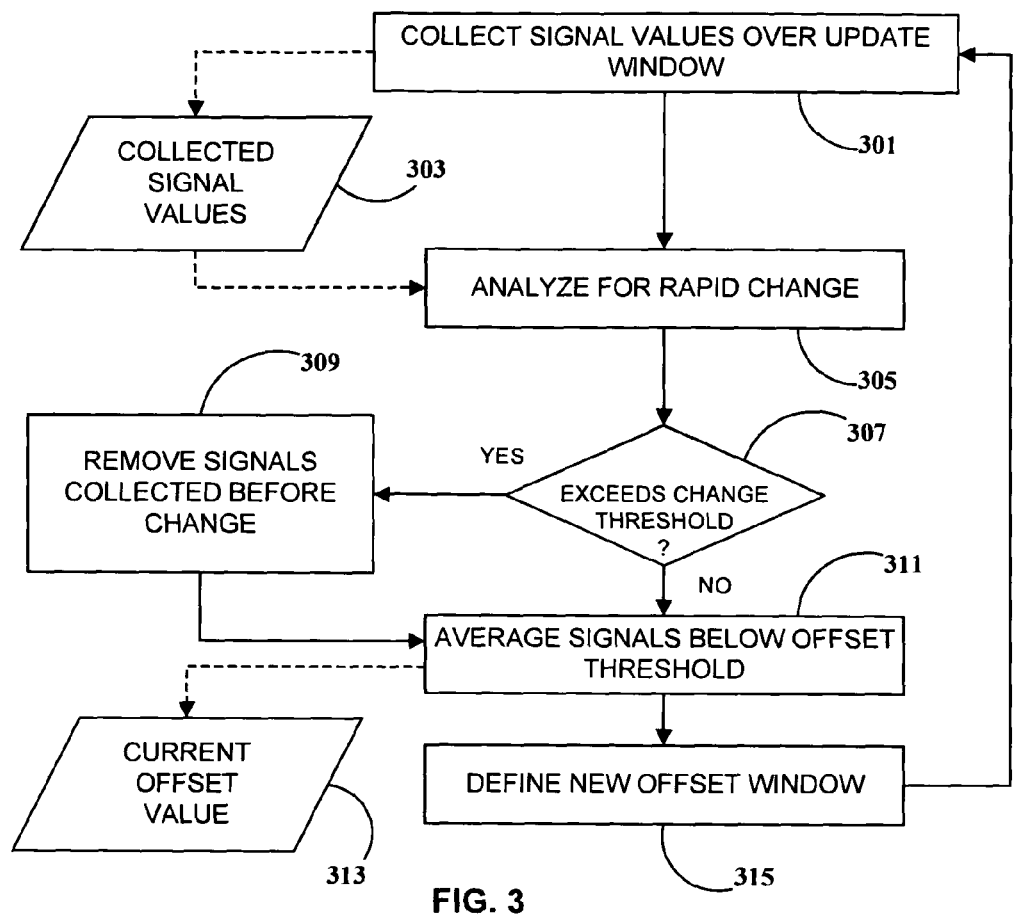
FIG. 3 is a flowchart of a method according to an embodiment of the present invention for computing an offset.

FIG. 3 is a flowchart of an exemplary method according to an embodiment of the present invention for computing an offset. In this embodiment, the periodic detection procedure for each digitized sensor signal is as follows:

1. In a collection step 301 signal values are collected over a given "update window" into a collection 303.
2. In an analysis step 305 the collected values are analyzed for rapid change; at a decision point 307 if a value change exceeding a predetermined change threshold is detected, all the values acquired prior to the change are removed from further consideration in a removal step 309.
3. From the remaining collected values, in an averaging step 311 all those below an offset threshold are averaged and the result is considered to be the current offset value 313; the offset threshold is determined for the current update window as that corresponding to a given lowest quantile in the distribution of the accumulated values.
4. In a step 313 a new update window is defined (possibly overlapping with the previous one) and the procedure is repeated.

According to another embodiment of the present invention, a relatively constant component of the offset, such as may be due to strain (e.g. a stretched steering wheel cover), a component of the excitation signal caused by forces other than operator gripping is subtracted from the signal of each sensor prior to the dynamic removal stage described above. According to an embodiment of the present invention, this component is determined during system initiation; according to another embodiment, this component is determined periodically. This feature handles a wide dynamic range and thus offers improved accuracy for the subsequent dynamic removal stage, which principally removes time-related changes to the offset.

In a further embodiment of the present invention, a constant component of the offset which is inherent to a sensor itself is subtracted from the sensor's output. Such a component may be determined during a calibration run and may be subtracted from the respective signal by hardware or software means. The subtraction of such an offset further improves the sensor readings presented to subsequent stages, to further increase accuracy.

Signal Selection

In general, under normal operation not all the sensors are subject to gripping by the operator. For example, a steering wheel typically is provided with sensors covering the entire grippable surface, whereas the operator can only grip a small portion at a time. The outputs of sensors gripped by the operator typically exhibit both higher values and a higher variance of the values than the outputs of sensors which are not being gripped. The higher variance is attributable to the physiological activity of the operator, including both controlling actions and involuntary phenomena.

In monitoring the operator's state of alertness, as carried out in subsequent processing steps (detailed below), only signals from gripped sensors are considered to be significant. The term "physiologically-significant" or simply "significant" herein denotes a sensor which is responding to physical gripping by the operator, and also denotes a signal output from such a sensor and the data values thereof. The term "non-significant" herein denotes a sensor which is not responding to physical gripping by the operator, and also denotes a signal output from such a sensor and the data values thereof. The goal is to ignore non-significant signals; non-significant signals contribute noise and only detract from the reliability of the results.

Thus, according to embodiments of the present invention, output signals from the various sensors are continually grouped into two categories—"significant" and "non-insignificant" by mutually comparing their average values, variances, and other relevant statistical parameters. Only those signals that are classified, at any given time, as "significant" are processed by subsequent steps, while "non-significant" signals are discarded.

Figure 4:
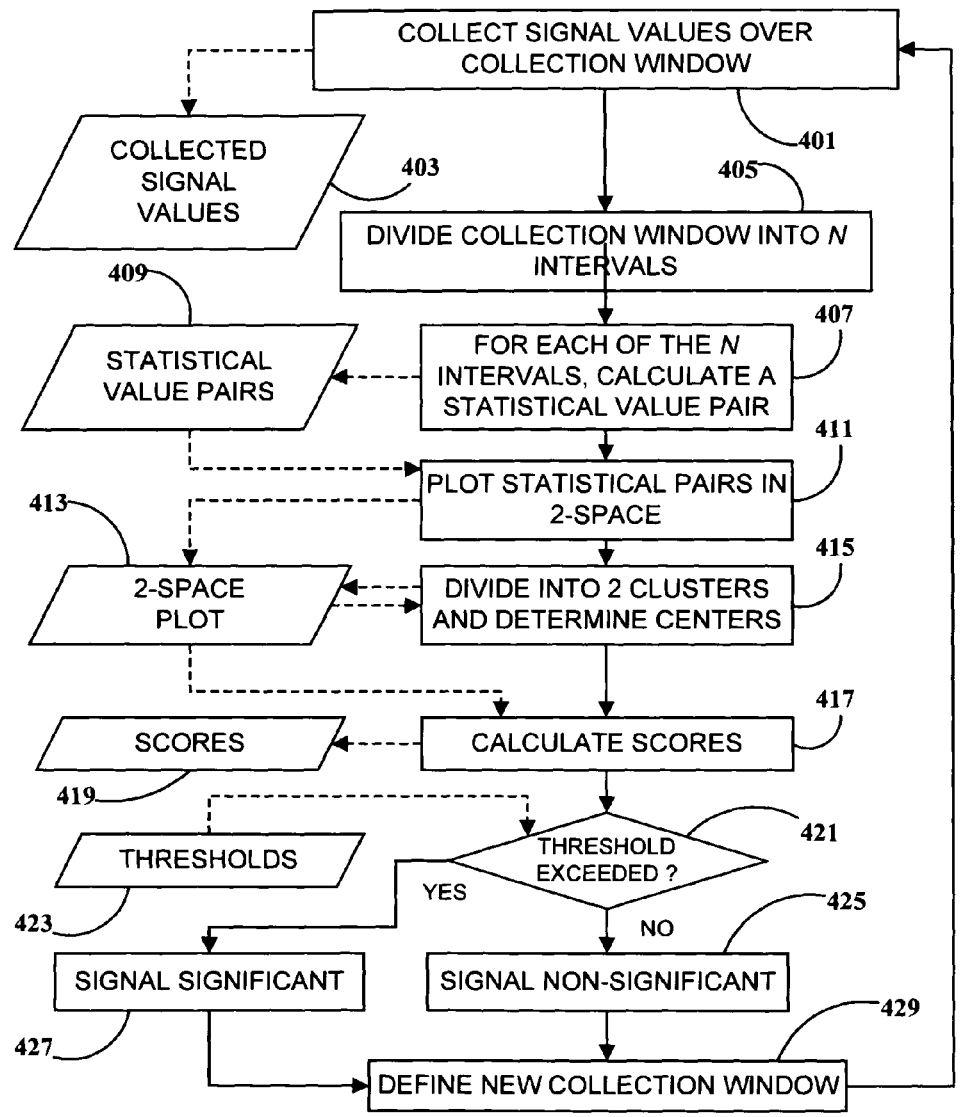
FIG. 4 is a flowchart of a method according to an embodiment of the present invention for collecting, classifying, and scoring data.

FIG. 4 is a flowchart illustrating an exemplary method according to an embodiment of the present invention. In this embodiment classification into proceeds for each (possibly offset-corrected) sensor output signal follows:

1. In a collection step 401 consecutive signal values 403 are collected over a given collection window.
2. In a window-division step 405 the window is divided into N consecutive equal time intervals (in a non-limiting example, one second each).
3. In a statistical step 407, for each of the N intervals, a pair of statistical parameter values 409 is calculated from each of the signal values therein—in a non-limiting example, the mean and the standard deviation constitute the pair of statistical parameter values.
4. In a plotting step 411 pairs of values 409 are plotted as corresponding points in a two-dimensional space plot 413.
5. In a clustering step 415 the points are divided into two clusters—a non-limiting example of a procedure for doing this is to use a k-means algorithm. Then the coordinates of the respective centers of the clusters are determined.

Figure 5:
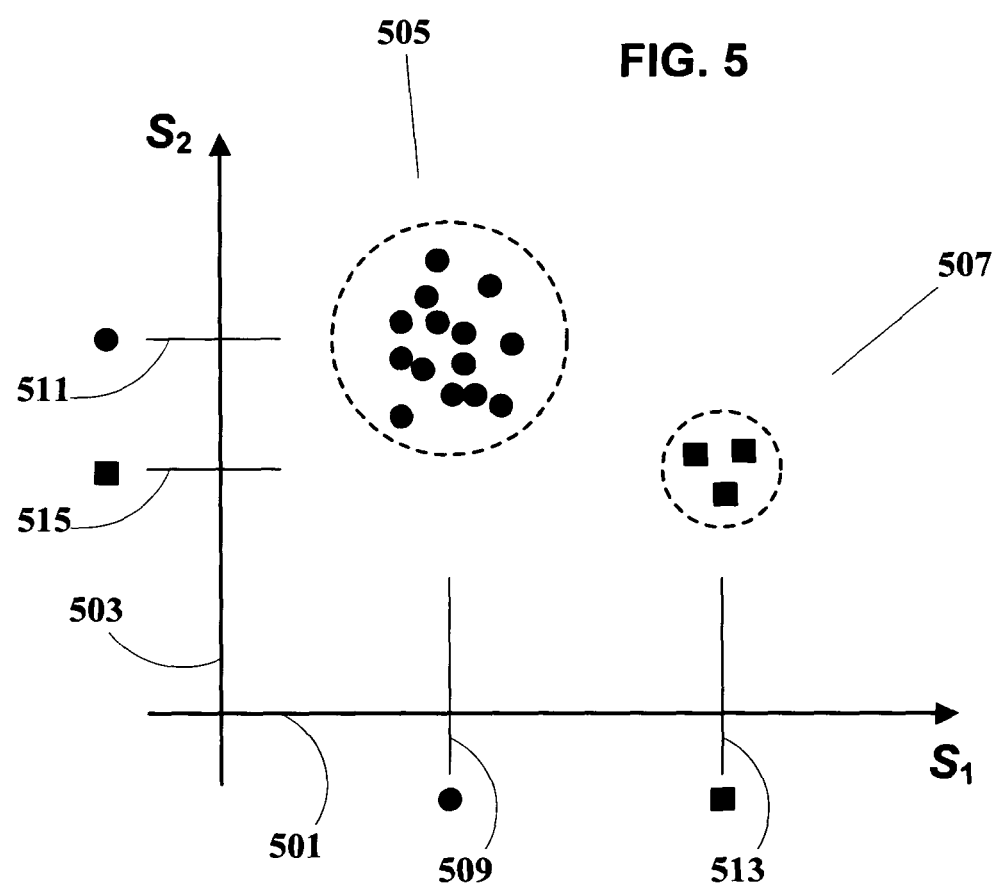
FIG. 5 conceptually illustrates a two-dimensional space plot of signal parameter value statistical pairs and clusters thereof, according to an embodiment of the present invention.

A two-dimensional space plot according to an embodiment of the present invention is conceptually illustrated in FIG. 5. A statistical parameter $S_1$ is plotted along an axis 501, and a statistical parameter $S_2$ is plotted along an axis 503. As noted above, in a non-limiting example, $S_1$ could be the mean of the signal values in an interval, whereas $S_2$ could be the mean of the signal values in an interval. Two clusters of points, a cluster 505 and a cluster 507 are identified, with respective center coordinates 509 and 511 for cluster 505; and center coordinates 513 and 515 for cluster 507.

It is noted that the two-dimensional space need not be a geometrical space, but can be implemented abstractly in analytical terms, a non-limiting expression of which is as entries in data tables. The two-dimensional space is portrayed herein graphically as a geometrical space for clarity of explanation, but this is a non-limiting illustration of a two-dimensional space. In practical terms, the analysis of the two-dimensional space is done by computer, in which case the two-dimensional space will be in terms of data representations rather than geometrically, where the "coordinate axes" are data values in a data structure. In such cases, the term "plotting" as used herein denotes assigning appropriate data values to the data structures.

6. In a scoring step 417 scores 419 are calculated from these clusters and compared at a decision point 421 against empirically-derived thresholds 423—to determine whether the signal during the latest interval is significant 427 or non-significant 425. Non-limiting examples of scores include:

(a) the normalized distance between the two centers along the "mean" coordinate;
    (b) the highest position of a cluster center along the "standard deviation" coordinate;
    (c) the distances from the two cluster centers to the points derived from the latest two intervals.

Preferably, if all three scores are smaller than the corresponding predetermined threshold values, the signal from the latest time interval is considered to be non-significant and is discarded; otherwise, if any of the scores is equal to or greater than the threshold value, the signal is selected and used in the next processing step.

In the non-limiting example illustrated in FIG. 5, the signals of the intervals of cluster 507 might be considered significant.

7. In a window definition step 429 a new window is defined, by dropping from the previous window the first time interval and adding to it the next consecutive time interval, and the above procedure is repeated.

In an embodiment of the present invention, Information concerning whether a specific sensor's output is significant that is instantaneously available during driving is used to develop a personal driving pattern. Comparison of a current driving pattern to a regular or reference pattern is then made according to predetermined criteria. According to this embodiment, a difference that exceeds a predetermined threshold, together with other parameters (including, but not limited to: vehicle speed and steering wheel grip intensity) triggers an alert signal.

In an embodiment of the present invention, a driving pattern consists of two stochastic objects:
time distribution of sensors activity; and
distribution of activity change.

The time distribution of sensors includes the probabilities of combinations of simultaneously significant sensors. For example, the probability that a current sensor is significant is estimated as a percent of driving time when this sensor was significant. In similar way, there may be estimated the probability for any pair of sensor to be simultaneously significant, and so forth. Distribution of significance change may be estimated as a frequency of significant sensor changes. In addition there may be added the probability of the event that a given significant sensor becomes non-significant at the same time a different non-significant sensor becomes significant—that is, one significant sensor is "replaced" by a different significant sensor (Markov chain model). The regular pattern is estimated by recording sensor significance over sufficiently long period of time (in a non-limiting example, hours of driving) and applying specific algorithms (in a non-limiting example, fuzzy logic). According to an embodiment of the present invention, a regular pattern is stored in the system and is updated manually or periodically updated automatically. According to another embodiment of the present invention, a current pattern is obtained by estimating similar parameters values over a relatively short time period (smaller than the time for regular pattern estimation). In an embodiment of the present invention, the system checks the current probabilities of current parameter values and generates an alarm if these probabilities are below a predetermined threshold—indicating that the current driving pattern is abnormally unusual.

According to an embodiment of the present invention, the system stores a multiplicity of regular patterns for different times, seasons, and so forth.

According to another embodiment of the present invention, the significance distribution of sensors is combined with other parameters, including but not limited to vehicle speed, steering wheel grip intensity, and so forth.

Proxy Grip Signal Generation

The term "proxy grip signal" herein denotes an n-valued signal where, for each sample time, the n values (or "components") are a function of the current values of the sensor signals as normalized and selected in the previous steps. In an exemplary method embodiment of the present invention, a typical function has two dependent variables (n=2), also denoted herein by the term "components".

Figure 6:
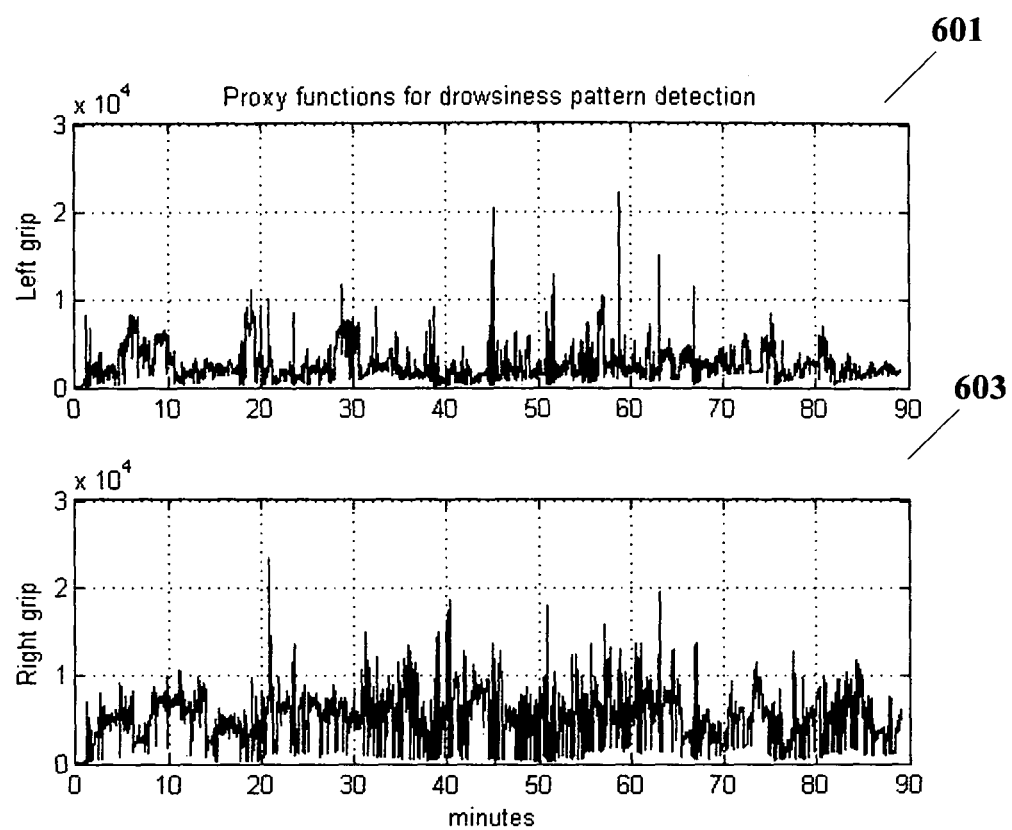
FIG. 6 illustrates non-limiting examples of the proxy functions for detecting the onset of drowsiness via grip signals from the left and right sides of a steering wheel.

Illustrations of typical readings are presented in FIG. 6, for the non-limiting example of proxy grip signals for n=2. A component 601 is a sum of signal values from sensors located on the left side of a steering wheel and a component 603 is a sum of signal values from sensors located at the right side of a steering wheel.

Other embodiments of the present invention utilize functions for n=1 or n>2, and are advantageous for certain applications or under certain conditions—as a non-limiting example, a function that tracks the operator's hand positions on the handle or the steering wheel.

In another embodiment of the present invention, a "relative gripping time" factor is periodically generated as the fraction of the length of each period during which the absolute value of the proxy grip signal is greater than a predetermined threshold. Such a factor is indicative of the intensity of the driving activity (regardless of the driver's state of alertness), which in turn is indicative of the objective driving conditions (such as road complexity or traffic density); it is therefore indicative of the driver's mental workload. It is known that a low mental workload facilitates drowsiness and thus the relative gripping time factor may be used in determining a sensitivity parameter (a non-limiting example of which is $p_0$—see below) during drowsiness pattern detection. In yet another embodiment of the present invention, a low relative gripping time factor is used directly to generate a signal to draw the driver's attention to the possibility of becoming drowsy.

Non-Adaptive Drowsiness Pattern Detection

Empirical data collected and analyzed by the present inventors suggests that states of operator alertness are associated with certain patterns in selected statistical parameters of the proxy grip signal, and that certain changes in the patterns reflected in parameter changes exceeding predetermined thresholds signifies an onset of drowsiness.

Therefore, an embodiment of the present invention includes assessing statistics of the proxy grip signal over two real-time sliding windows:

1. a relatively long sliding window (denoted herein as the "history window") of a time duration denoted herein as $T_h$; and
2. a relatively short window (referred to as the "current window") of a time duration denoted herein as $T_c$, where $T_c < T_h$.
   It is noted that the current window overlaps the history window from the present time to the beginning of the current window.

Figure 7:
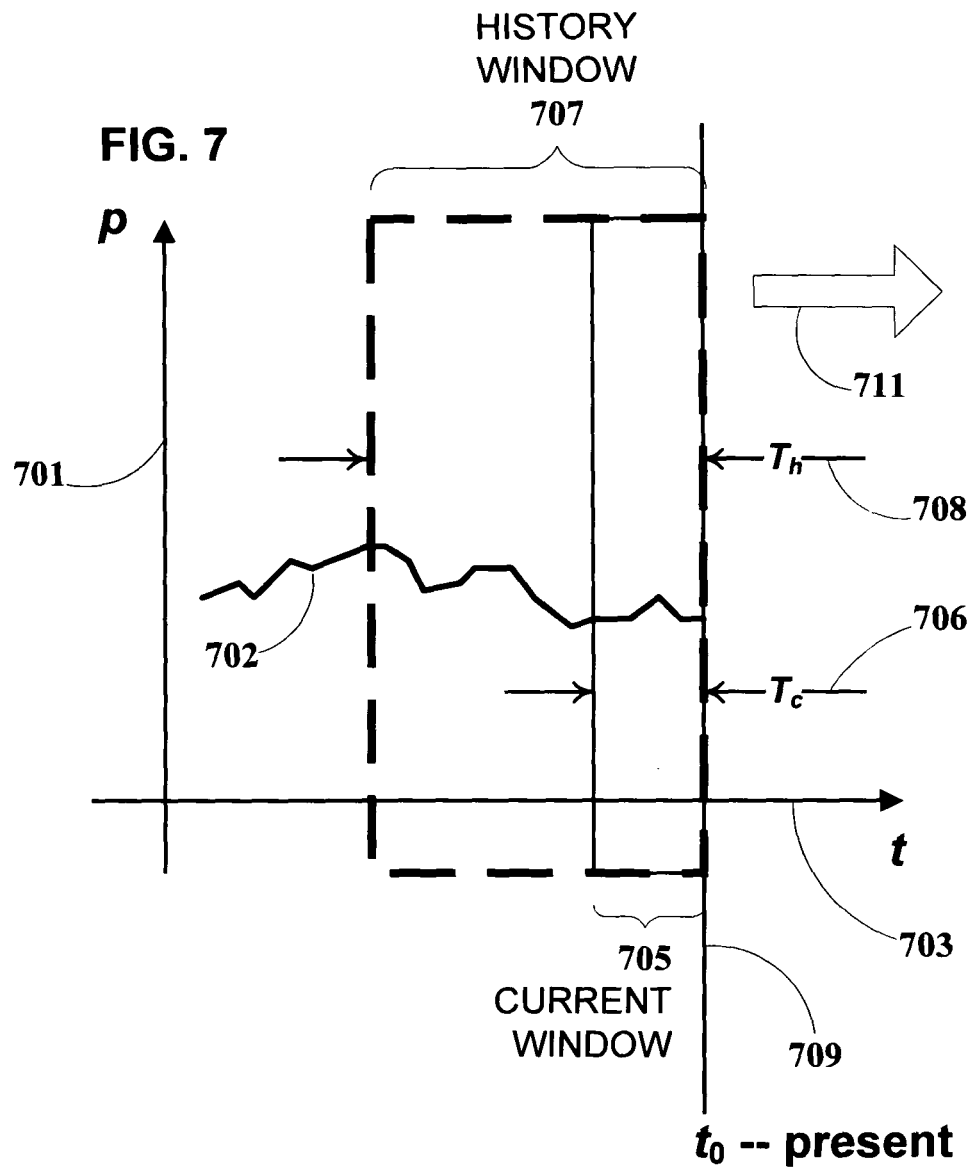
FIG. 7 conceptually illustrates a sliding history window and a sliding current window according to an embodiment of the present invention.

The sliding windows according to this embodiment of the present invention are conceptually illustrated in FIG. 7. Physical parameters are plotted against a parameter axis 701 (as an exemplary plot 702) along a time axis 703. The present time $t_0$ is indicated as a line 709 which proceeds forward in time in a direction 711 relative to time axis 703. A current window 705 has a time duration $T_c$ 706, and a history window 707 has a time duration $T_h$ 708.

In this embodiment, one or more scores are calculated by relating the statistics of the current window with those of the history window. According to the embodiment, comparison of these scores against empirically-obtained threshold values allows detecting a drowsiness pattern and thus to determining the state of drowsiness versus alertness of the operator.

Figure 8:
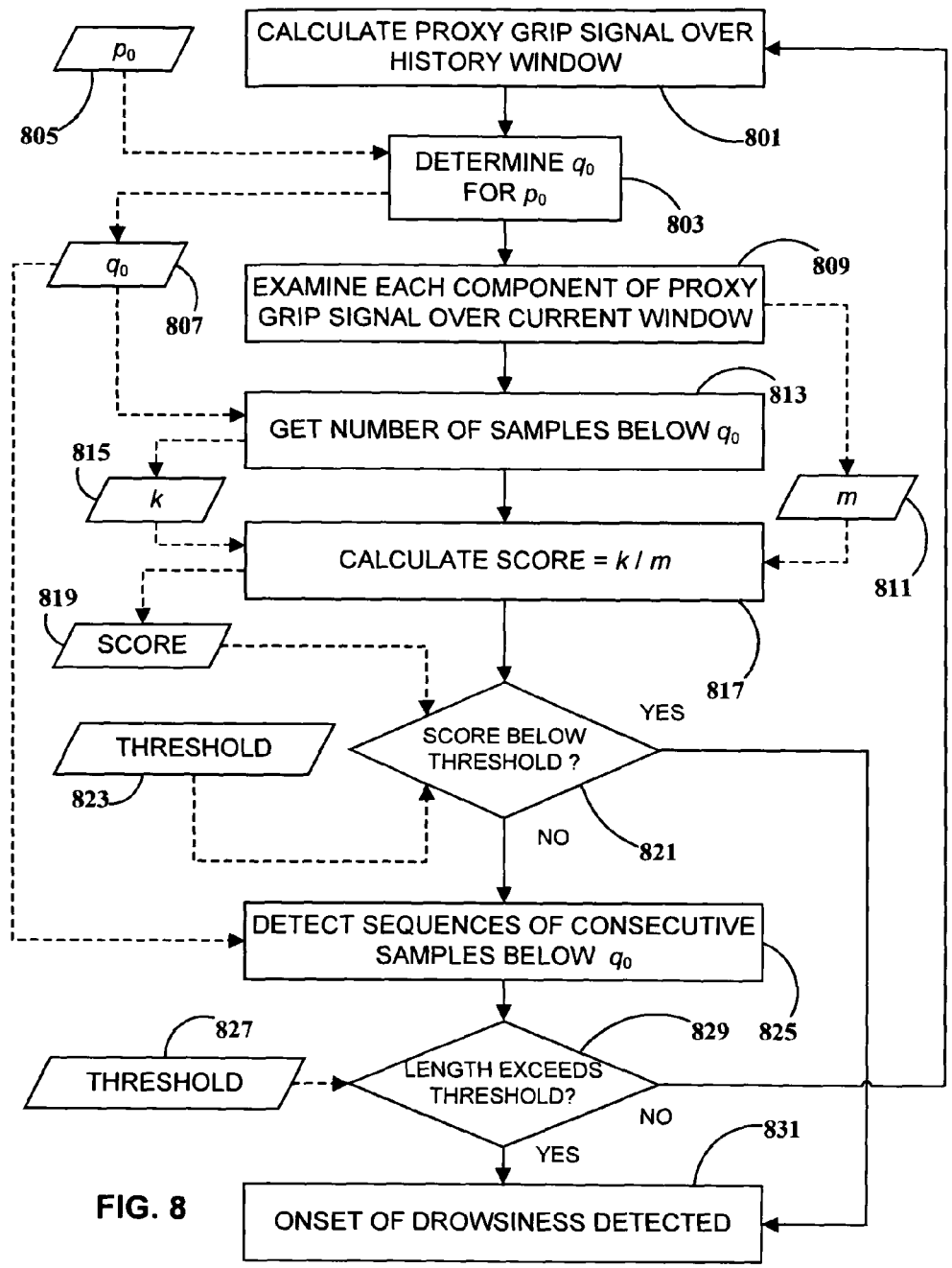
FIG. 8. is a flowchart of methods according to embodiments of the present invention for detecting the onset of drowsiness.

FIG. 8 is a flowchart of a method according to an embodiment of the present invention, in which detection of a drowsiness pattern proceeds as follows:

1. In a calculation step 801 the distribution function of each component of the proxy grip signal over the history window is continuously calculated.
2. For each such distribution function, a quantile limit, $q_0$ 807 is determined in a step 803 that corresponds to a predetermined probability $p_0$ 805.
3. In a step 809 each component of the proxy grip signal is examined over the current window and the number k 815 of samples whose values are less than $q_0$ 807 of the corresponding history window is recorded, along with the total number m 811 of samples in the current window. A score 819 is calculated as the ratio of k 815 to m 811. If scores 819 for both proxy grip components fall below a predetermined threshold value 823 at a decision step 821, the a drowsiness pattern is indicated, detecting onset of drowsiness 831.
4. In another embodiment of the present invention, detecting onset of drowsiness 831 is done as follows: Sequences of consecutive samples whose value is below $q_0$ 807 are detected; if the length of any sequence exceeds a given threshold value 827 a drowsiness pattern is indicated, detecting onset of drowsiness 831.

Figure 9:
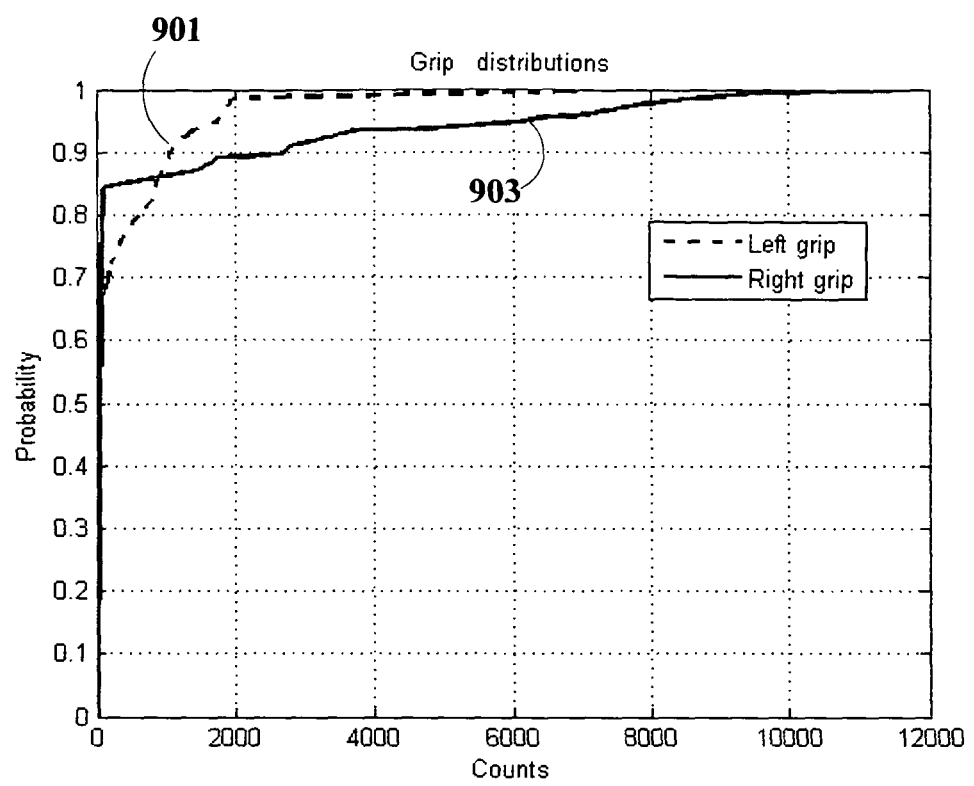
FIG. 9 illustrates non-limiting examples of distribution functions of proxy grip signals over a history window according to an embodiment of the present invention.
Figure 10:
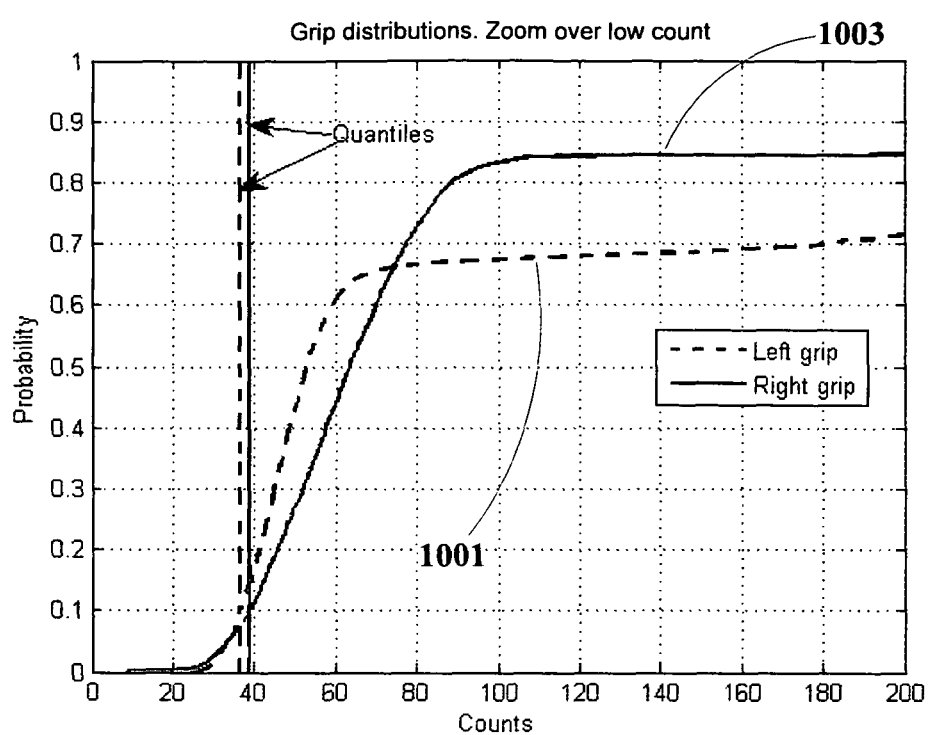
FIG. 10 illustrates a zoom over small grip values of the non-limiting examples of FIG. 9.

Non-limiting examples of distribution functions of each component (variable) of the proxy grip signal over the history window (5 minute length) are shown in FIG. 9 for a left grip distribution 901 and a right grip distribution 903. A zoom over low counts corresponding to FIG. 9 is shown in FIG. 10 for a left grip distribution 1001 and a right grip distribution 1003. Quantiles select low levels of grips used for score calculations.

Alert Activation Threshold

According to embodiments of the present invention, a vehicle which is traveling at a speed that does not exceed a predetermined "alert activation" threshold speed is considered non-dangerous regarding the onset of operator drowsiness, and drowsiness alerts are not activated under such a condition. Typically, the speed chosen for an alert activation threshold is low, a non-limiting example of which might be 5 kilometers per hour. A special case of an alert activation threshold speed is zero (0), in which case a stationary vehicle is considered safe, and in this case no alerts would be generated for the vehicle when not moving.

In these embodiments of the present invention, vehicle speeds which do not exceed the alert activation threshold speed are excluded from consideration during analysis, processing, and drowsiness detection.

In other embodiments of the present invention, the concept of an alert activation threshold is generalized for other kinds of equipment and apparatus besides vehicles. In a non-limiting example, a crane or similar lifting device requires an alert operator at all times during operation, and would have an alert activation threshold based on the speed of the lifting head, boom motion, and/or motor RPM.

Adaptive Drowsiness Pattern Detection

Drowsiness pattern detection may be affected by various external factors, such as the relative gripping time factor (see previous section), the time of day, air temperature and traveling speed.

The given probability level $p_0$ 805 (FIG. 8) may be affected by various external factors, such as the relative gripping time factor, the time of day, air temperature and traveling speed. In an embodiment of the present invention, two or more levels of drowsiness are detectable, e.g. by using corresponding different values of $p_0$ or more generally defining different drowsiness patterns; this may lead to corresponding types of alerting signals (see below).

Distribution functions determined above in calculation step 801 are adaptive according to certain embodiments of the present invention. The given probability level $p_0$ 805 and threshold value for scores 819 may be defined as functions of day, time of day, year, season, and elapsed time of the operator's driving.

Figure 11:
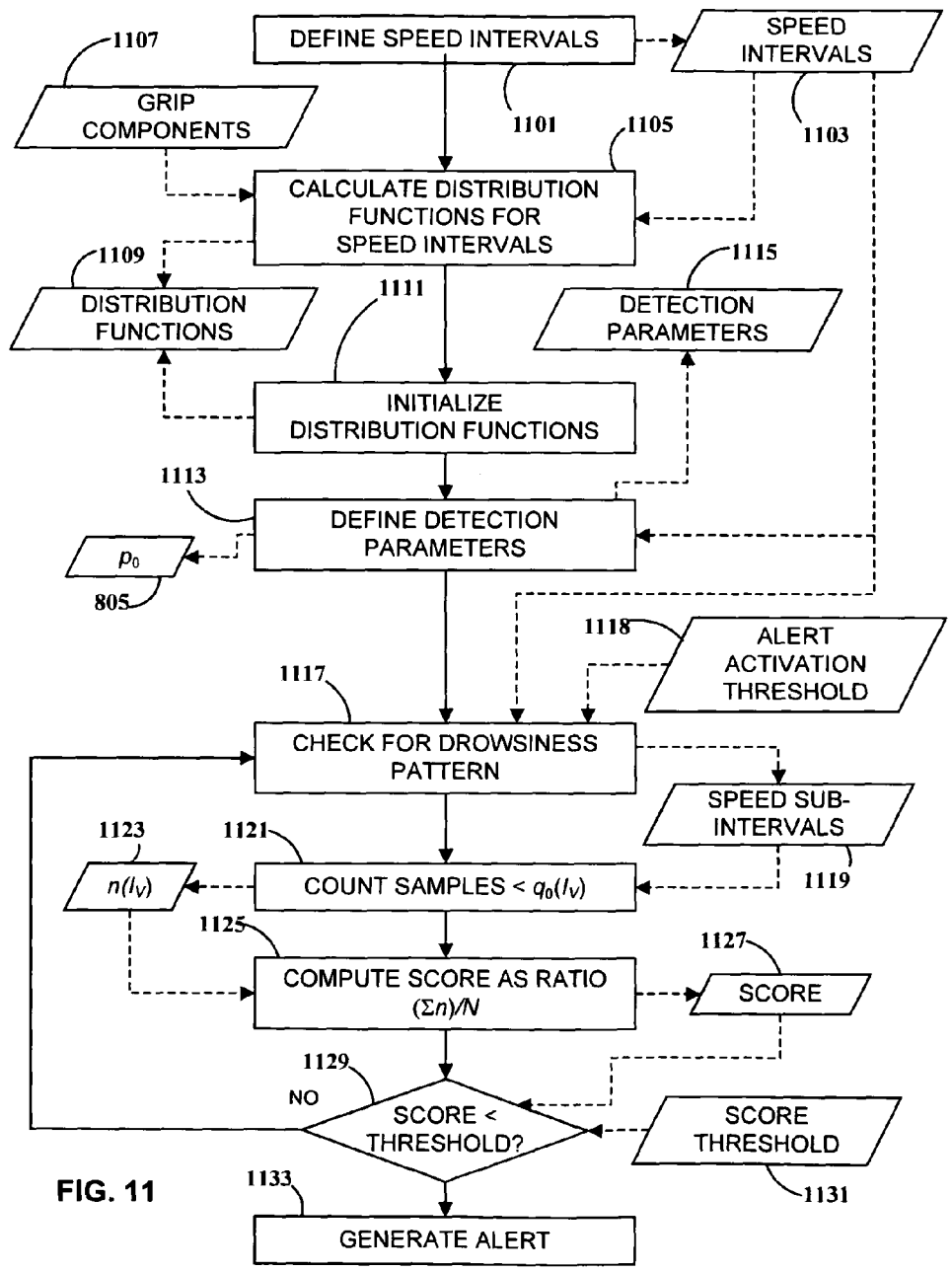
FIG. 11 is a flowchart of another method according to an embodiment of the present invention for detecting the onset of drowsiness.

Adaptation to other external factors is implemented according to embodiments of the present invention. FIG. 11 is a flowchart of a non-limiting example according to an embodiment of the present invention. In this example, the external factor of traveling speed is implemented in the following steps:

1. Define speed intervals 1103, in an interval definition step 1101. The speed domain is divided into contiguous, non-overlapping intervals. For example, below 20 km/h, from 20 km/h to 50 km/h and over 50 km/h. As noted previously, a speed that does not exceed a predetermined alert activation threshold speed is excluded from consideration in certain embodiments of the present invention.
2. Calculate a distribution function 1109 for each speed interval, in a calculation step 1105. Collect grip components 1107 and generate the corresponding distribution functions 1109. To start, time distributions are calculated when the number of samples reaches a predetermined threshold $N(I_V)$. This threshold number of samples depends in general on the speed interval. Thereafter, distributions are updated when a predetermined number $\Delta N(I_V)$ of additional samples is accumulated.
3. Initialize distribution functions 1109, in an initialization step 1111. Adaptive distributions may be applied only after the predetermined threshold number is reached for the first time. Before this, the drowsiness pattern detection is based on distributions calculated over the first history window 707 (FIG. 7).
4. Define detection parameters 1115, in a parameter definition step 1113. Probability levels $p_0$ 805 (FIG. 8) are defined per traveling speed interval 1103. In an embodiment of the present invention, the size of window 707 (FIG. 7) for proxy grip signal examination and threshold values for drowsiness detection are speed-independent. However, window size and threshold values may be time-dependent.
5. Check for drowsiness pattern in a detection step 1117. In embodiments of the present invention, the examination interval is divided into subintervals 1119 depending on current vehicle speed, observing a predetermined alert activation threshold 1118 as previously described. At each subinterval samples $n(I_V)$ 1123 below corresponding quantile $q_0(I_V)$ are counted in a step 1121. The ratio of the number of low-value samples over all subintervals to the total samples in the examination interval is computed as a score 1127 for drowsiness pattern detection in a step 1125. If the scores for both grips are below a predetermined score threshold 1131 in a decision point 1129, then a drowsiness pattern is detected and an alert is generated in a step 1133.

The above implementation is adaptive to time and traveling speed (or other scalar factor) simultaneously.

For any other factor adaptation may be performed in the same manner.

In one exemplary embodiment adaptation algorithm presented above is implemented regarding deceleration.

This implementation is valid also in case when it is necessary to perform simultaneous adaptation to a number of external factors different from time. In this case multidimensional space of factors values is divided on contiguous, non-overlapping set of subspaces and distribution functions are determined for each subspace. As noted previously, a speed that does not exceed a predetermined alert activation threshold speed is excluded from consideration in certain embodiments of the present invention.

In one exemplary embodiment adaptation algorithm presented above is implemented for two factors: speed and deceleration.

Operator Request Mode

In another embodiment of the present invention, the system is activated upon receiving an operator's active request for alertness monitoring. An operator is often aware of an oncoming drowsiness condition; it is believed that when the operator is aware of oncoming drowsiness, this awareness is typically at least as reliable as externally-monitored detection of drowsiness. Under these circumstances, the operator needs some stimulus to avoid often-fatal episodes of unconsciousness, which may last as long as several seconds. That is, an operator may desire practical assistance in overcoming the drowsiness, not merely the confirmation of drowsiness which is provided by current prior art passive detection systems, which serve as monitors without benefit of the operator's active participation.

In this embodiment, an operator request mode is activated. In this mode there are typically no false positives; once the operator has voluntarily made an operator request upon feeling drowsy, no alert signal is interpreted as false alarm. Also, as is explained herein, the operator can avoid receiving an alerting signal by making a personal effort to stay awake, with the benefit of remaining more alert as result.

The operator request mode according to this embodiment of the present invention benefits from the operator's fight against drowsiness by invoking active countermeasures involving muscle activity (non-limiting examples of which include: moving; stretching; scratching; and yawning). A simple and effective countermeasure against drowsiness involves voluntarily engaging in some mild physical activity. It is known that as long as one muscle is active, the operator will stay awake. This countermeasure, however, is effective only for a limited time duration.

In the operator request mode according to this embodiment, the operator assumes sole responsibility for proper operation (e.g., lawful driving). If the suggested drowsiness countermeasures do not sustain alertness, then the operator must terminate operation as soon as possible.

In a further embodiment of the present invention the method for the operator request mode can include initiating a Psychomotor Vigilance Test (PVT), which is in itself stimulating countermeasure. In the following example according to an embodiment of the present invention, the parameter values given are understood to be non-limiting examples only. The first alert signal following activation of the operator request mode is reset automatically after 10 seconds. The system expects that the operator's action following an alert (including, but not limited to: a beep; a flashing light; a vibrating seat; or a combination thereof) will restore the operator to a state of alertness. If this restoration does not take place, then the alert signal will be reactivated at the end of the 10 seconds, with a test window not longer than 30 seconds.

For example, in the case of driving: The test window duration can be further subject to time-of-day and/or time-on-drive. During the day, the period can be 30 seconds, automatically reducing to 10 seconds at night. Likewise, the test window can be for 30 seconds when continuously cruising during the day at over 60 km/hr for less than 90 minutes, automatically reducing to 10 seconds after those 90 minutes.

Generating an Alert Signal

According to certain embodiments of the present invention, an alert signal is generated whenever a drowsiness pattern is detected. In a further embodiment of the present invention, multiple drowsiness patterns are defined, corresponding to different levels of operator alertness. In such a case, corresponding different scores are calculated in the appropriate step, with corresponding different indications. Corresponding different alerting signals may then be generated; non-limiting examples, listed in order of severity, include:

an alerting signal to draw the attention of the operator to the likelihood of drowsiness. According to an embodiment of the present invention, this is based solely on the value of the gripping time factor;

initiation of a Psychomotor Vigilance Test (PVT), during which the operator's reaction time can be measured and interpreted as supporting data;

a warning signal, cautioning the operator that early signs of drowsiness have been detected;

an alarm signal, demanding the operator to stop;

an emergency signal to be sent outside and/or to initiate an automatic wind-down sequence of vehicle operation.

In some embodiments of the present invention, alerting signal generation also depends on the history of drowsiness indications—a non-limiting example of which is a distribution of drowsiness patterns over a certain time interval, or since the previous indication. In some embodiments of the present invention, alerting signal generation also depends on driving parameters, non-limiting examples of which include: vehicle speed; vehicle weight; road geometry; and brake activation. In another embodiment, alerting signal generation is suspended when the vehicle moves below a predetermined speed or is stationary.

In some embodiments alerting signal generation depends on day-time or/and year season. To implement this, a number of parameter sets is embedded in the system. Each set determines drowsiness pattern detection and alert generation at predefined time period. Adjustment may be performed automatically (default regime) or manually by operator. In default regime the system selects the proper set of parameters automatically depending on inner (or GPS supplied) clock. In manual regime the operator selects one of the above sets at any moment depending on exceptional external conditions.

In some embodiments alerting signal generation depends on driver's sensitiveness to alarms. Namely, some drivers (e.g. with less experience) may accept a couple of false alarms in order to be sure that smallest and may be less significant indications of drowsiness are not missed and proper alerts are generated. Unlike this the experienced driver may prefer the system less sensitive that generates alarms when the singes of drowsiness are strong and obvious and hence the driver's drowsiness condition could be dangerous. To implement this "driver's sensitivity" dependence a finite number of corresponding sets of parameters are embedded in the system. These sets differ mainly in probability $P_0$ and threshold that determine drowsiness pattern detection (see items 2 and 3 on "Non-adaptive drowsiness pattern detection" above). In general 3 sensitivity levels may be implemented: default, high (for less experienced drivers) and low (for high experienced driver). After system activation adjustment to non-default sensitivity level is performed manually by driver.

System and Computer Product

Figure 12:
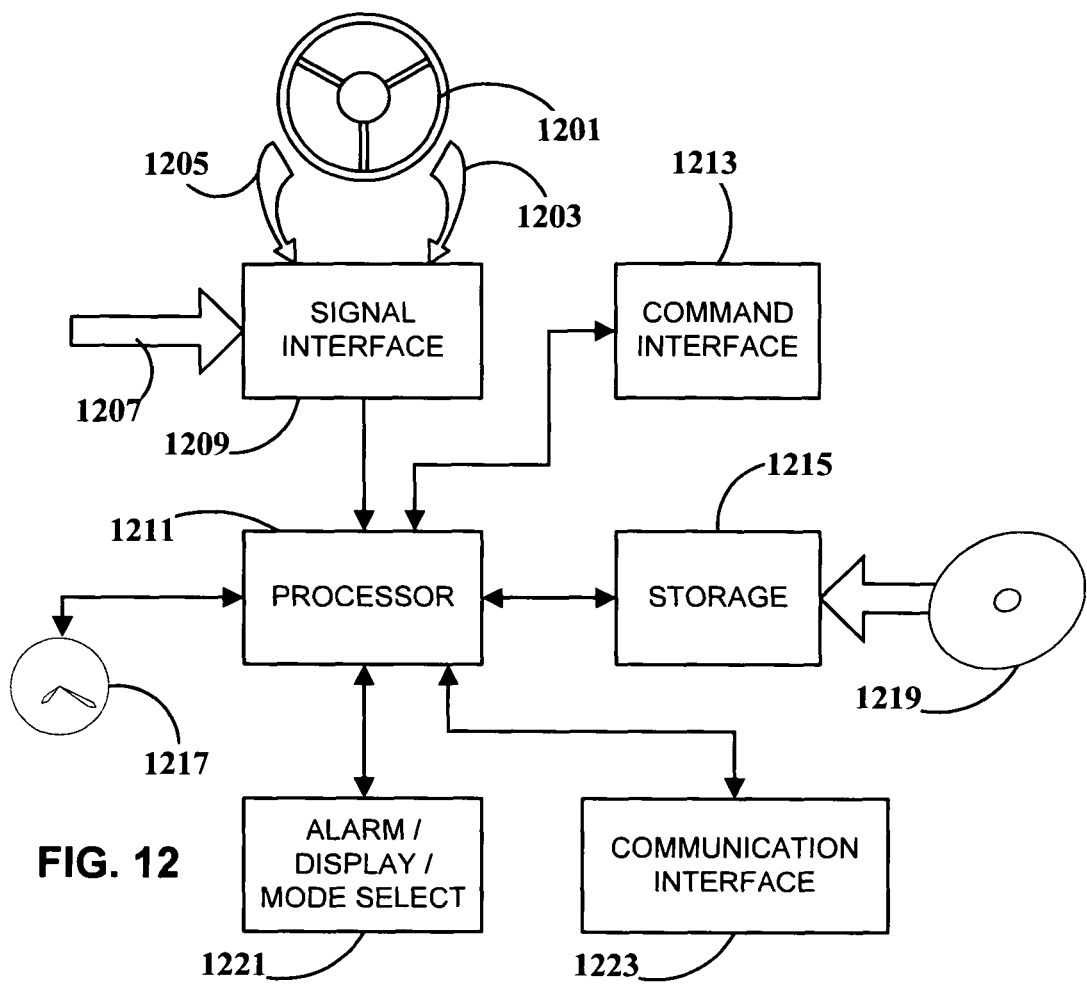
FIG. 12 is a block diagram which schematically illustrates a system according to the present invention, and a computer product therefor.

A system according to an embodiment of the present invention is illustrated in the block diagram of FIG. 12. A steering wheel 1201 provides a right signal 1203 and a left signal 1205 which are input into a signal interface 1209, which accepts operator gripping signals indicative of the physical gripping of the operator upon steering wheel 1201, and also accepts additional inputs 1207 including, but not limited to factors such as vehicle speed. In an embodiment of the present invention, signal interface 1209 also performs some pre-processing on the signals. A data processor 1211 receives the input signals from signal interface 1209, a command interface 1213, and a real-time clock 1217 having date and calendar capabilities, which in addition to providing date and time for logging, also provides timing signals for intervals, durations, and programmed timed interrupts. Command interface 1213 can be used to set up predetermined parameters and thresholds. Data storage 1215 provides memory storage for parameters and calculated results, predetermined thresholds, and executable program storage. Storage 1215 can combine one or more types of non-transitory physical storage, including, but not limited to: semiconductor register memory, magnetic memory and data storage, optical memory and data storage, flash memory, and the like. Portable and/or removable data and program storage 1219 can be used to install or hold large amounts of data and program code. An alarm/display/mode select unit 1221 is used to signal the operator with audible and visible signals, readouts, and the like, and to receive operator input such as resets and operator request mode activation. A communication interface 1223 allows the system to communicate with external systems by means which include, but which are not limited to: wireless data communications and network access, such as via the Internet; and the Global Positioning System (GPS). Outputs from the system can be logged and recorded remotely, and alarms can also be signaled remotely in this fashion. A system according to embodiments of the present invention is configured to perform methods of the present invention.

Data processor 1211 has computer capabilities, and further embodiments of the present invention provide a computer product for performing methods of the present invention and variants derived therefrom.

A computer product according to these embodiments includes a set of executable commands for a computer such as processor 1211 within tangible non-transitory data storage including, but not limited to: non-transitory computer media of any kind, such as magnetic media and optical media; computer memory; semiconductor memory storage; flash memory storage; data storage devices and hardware components; and a computer or communications network. The terms "perform", "performing", etc., and "run", "running", when used with reference to a computer product herein denote that when the executable commands within the computer product are executed, the computer product causes the computer such as processor 1211 to perform the predefined actions.

While the invention has been described with respect to a limited number of embodiments, it will be appreciated that many variations, modifications and other applications of the invention may be made.

We claim:

1. A method for detecting the physiological onset of fatigue of an operator, comprising:
    providing a plurality of like sensors on an operating handle to be gripped by the operator, wherein the sensors output a plurality of signals, each signal of the plurality of signals indicating a gripping force exerted by the operator;
    removing an offset from at least one signal of the plurality of signals by:
        collecting signal values over an update window into a collection;
        removing values from the collection which were collected prior to a value change exceeding a predetermined threshold;
        determining an offset threshold corresponding to a lowest quantile in a distribution of the values;
        taking the average of the values below the offset threshold as the offset; and
        subtracting the offset from the at least one signal;
    selecting at least two physiologically-significant signals from the plurality of signals;
    combining the at least two physiologically-significant signals to form a proxy grip signal;
    processing the proxy grip signal to detect a pattern indicative of the onset of operator fatigue; and
    generating an alert in response to detecting the pattern.

2. The method of claim 1, wherein the proxy grip signal comprises a plurality of component signal values, and wherein each component signal value of the plurality of component signal values is a function of the current values of the sensor signals.

3. The method of claim 1, wherein selecting a physiologically-significant signal comprises:
    collecting consecutive signal values over a collection window;
    dividing the collection window into an integral number of consecutive equal time intervals;
    for each of the time intervals, calculating a pair of statistical parameter values for each of the signal values in the time interval;
    plotting at least two signal values according to the corresponding statistical parameter values thereof in a two-dimensional space;
    dividing the at least two signal values into two clusters and determining the coordinates of the centers of the clusters;
    determining a score according to the two clusters for a signal in the latest time interval;
    if the score of the signal is less than a predetermined threshold, then discarding the signal as not physiologically-significant; and
    if the score of the signal is not less than the predetermined threshold, then keeping the signal as physiologically-significant.

4. The method of claim 3, wherein dividing the at least two signal values into two clusters is done with a k-means algorithm.

5. The method of claim 3, wherein the a pair of statistical parameter values comprises a mean and a standard deviation.

6. The method of claim 3, wherein the score is calculated as a normalized distance to a centers of a cluster.

7. The method of claim 3, wherein the score is calculated as a highest position of a cluster along a coordinate of the two-dimensional space.

8. The method of claim 2, wherein processing the proxy grip signal to detect a pattern indicative of the onset of operator fatigue comprises:
    calculating a distribution function of each component signal value of the proxy grip signal over a history window;
    for each distribution function, determining a quantile limit corresponding to a predetermined probability;
    obtaining a number k of samples whose values are less than the quantile limit;
    obtaining a total number m of samples in a current window;
    calculating a score as a ratio of k to m; and if a predetermined number of proxy grip component signal value scores are less than a predetermined threshold value, then indicating the physiological onset of operator fatigue.

9. The method of claim 8, wherein the predetermined number of proxy grip component signal value scores is 2.

10. The method of claim 3, wherein the operator is operating a vehicle having a speed, the method further comprising:
defining a plurality of contiguous, non-overlapping speed intervals;
calculating a distribution function of the proxy grip signal for each speed interval; and
processing the distribution function of the proxy grip signal to detect a pattern indicative of the onset of operator fatigue.

11. The method of claim 10, further comprising:
defining an alert activation threshold speed for the vehicle, wherein a vehicle speed which does not exceed the alert activation threshold speed is excluded from the plurality of speed intervals.

12. The method of claim 1, further comprising:
receiving an operator request for alertness monitoring; and
responsive to receiving the operator request, activating an operator request mode, wherein no alert is interpreted as a false alarm.

13. A system for detecting the physiological onset of fatigue of an operator, comprising:
a signal interface operative to accept a plurality signals from a plurality of operator gripping sensors; and
a data processor;
wherein the system is configured to perform:
removing an offset from at least one signal of the plurality of signals;
selecting at least two physiologically-significant signals from the plurality of signals, wherein selecting a physiologically-significant signal comprises:
collecting consecutive signal values over a collection window;
dividing the collection window into an integral number of consecutive equal time intervals;
for each of the time intervals, calculating a pair of statistical parameter values for each of the signal values in the time interval;
plotting at least two signal values according to the corresponding statistical parameter values thereof in a two-dimensional space;
dividing the at least two signal values into two clusters and determining the coordinates of the centers of the clusters;
determining a score according to the two clusters for a signal in the latest time interval;
if the score of the signal is less than a predetermined threshold, then discarding the signal as not physiologically-significant; and
if the score of the signal is not less than the predetermined threshold, then keeping the signal as physiologically-significant;
combining the at least two physiologically-significant signals to form a proxy grip signal;
processing the proxy grip signal to detect a pattern indicative of the onset of operator fatigue; and
generating an alert in response to detecting the pattern.

14. The system of claim 13, wherein the proxy grip signal comprises a plurality of component signal values, wherein each component signal value of the plurality of component signal values is a function of the current values of the sensor signals, and wherein processing the proxy grip signal to detect a pattern indicative of the onset of operator fatigue comprises:
calculating a distribution function of each component signal value of the proxy grip signal over a history window;
for each distribution function, determining a quantile limit corresponding to a predetermined probability;
obtaining a number k of samples whose values are less than the quantile limit;
obtaining a total number m of samples in a current window;
calculating a score as a ratio of k to m; and
if a predetermined number of proxy grip component signal value scores are less than a predetermined threshold value, then indicating the physiological onset of operator fatigue.

15. A computer product for detecting the physiological onset of fatigue of an operator, the product comprising tangible non-transient computer-readable data storage that includes a set of executable commands for a computer, which commands, when executed by the computer, cause the computer to perform:
receiving a plurality of signals, each signal of the plurality of signals indicating a gripping force exerted by the operator;
removing an offset from at least one signal of the plurality of signals by:
collecting signal values over an update window into a collection;
removing values from the collection which were collected prior to a value change exceeding a predetermined threshold;
determining an offset threshold corresponding to a lowest quantile in a distribution of the values;
taking the average of the values below the offset threshold as the offset; and
subtracting the offset from the at least one signal;
selecting at least two physiologically-significant signals from the plurality of signals;
combining the at least two physiologically-significant signals to form a proxy grip signal;
processing the proxy grip signal to detect a pattern indicative of the onset of operator fatigue; and
generating an alert in response to detecting the pattern.

16. The computer product of claim 15, wherein selecting a physiologically-significant signal comprises:
collecting consecutive signal values over a collection window;
dividing the collection window into an integral number of consecutive equal time intervals;
for each of the time intervals, calculating a pair of statistical parameter values for each of the signal values in the time interval;
plotting at least two signal values according to the corresponding statistical parameter values thereof in a two-dimensional space;
dividing the at least two signal values into two clusters and determining the coordinates of the centers of the clusters;
determining a score according to the two clusters for a signal in the latest time interval;
if the score of the signal is less than a predetermined threshold, then discarding the signal as not physiologically-significant; and
if the score of the signal is not less than the predetermined threshold, then keeping the signal as physiologically-significant.

17. The computer product of claim 15, wherein the proxy grip signal comprises a plurality of component signal values, wherein each component signal value of the plurality of component signal values is a function of the current values of the sensor signals, and wherein processing the proxy grip signal to detect a pattern indicative of the onset of operator fatigue comprises:
- calculating a distribution function of each component signal value of the proxy grip signal over a history window;
- for each distribution function, determining a quantile limit corresponding to a predetermined probability;
- obtaining a number k of samples whose values are less than the quantile limit;
- obtaining a total number m of samples in a current window;
- calculating a score as a ratio of k to m; and
- if a predetermined number of proxy grip component signal value scores are less than a predetermined threshold value, then indicating the physiological onset of operator fatigue.

\* \* \* \* \*